(12) United States Patent
Monk

(10) Patent No.: US 10,561,279 B2
(45) Date of Patent: Feb. 18, 2020

(54) UTENSIL REST

(71) Applicant: Kitchinventions, LLC, Jupiter, FL (US)

(72) Inventor: Derek Monk, Jupiter, FL (US)

(73) Assignee: Kitchinventions, LLC, Jupiter, FL (US)

( * ) Notice: Subject to any disclaimer, the term of this patent is extended or adjusted under 35 U.S.C. 154(b) by 66 days.

(21) Appl. No.: 15/968,815

(22) Filed: May 2, 2018

(65) Prior Publication Data

US 2018/0325321 A1 Nov. 15, 2018

Related U.S. Application Data

(60) Provisional application No. 62/505,260, filed on May 12, 2017.

(51) Int. Cl.
*A47J 47/16* (2006.01)
*A47J 43/28* (2006.01)
*G01F 19/00* (2006.01)

(52) U.S. Cl.
CPC .............. *A47J 43/287* (2013.01); *A47J 47/16* (2013.01); *G01F 19/002* (2013.01)

(58) Field of Classification Search
CPC ................................ A47J 47/16; G01F 19/002

USPC ............................................................ 73/427
See application file for complete search history.

(56) References Cited

U.S. PATENT DOCUMENTS

| | | | | |
|---|---|---|---|---|
| 5,823,483 A * | 10/1998 | Gaskill | ................ | A47J 43/287 248/37.6 |
| 6,619,604 B1 * | 9/2003 | Stillman | ................ | A47J 45/02 248/205.5 |
| 6,991,200 B2 * | 1/2006 | Stillman | ................ | A47J 45/02 15/257.01 |
| 9,414,717 B2 * | 8/2016 | Tollasepp | ................ | A47J 47/20 |
| 9,808,123 B1 * | 11/2017 | Brinkmann | ............. | A47L 23/05 |
| 2014/0034795 A1 * | 2/2014 | Brinkmann | ............ | F16M 13/02 248/213.2 |

* cited by examiner

*Primary Examiner* — Jamel E Williams
(74) *Attorney, Agent, or Firm* — Berger Singerman LLP; Geoffrey Lottenberg

(57) ABSTRACT

A utensil rest has a main body, a handle rest extending outward and away from the main body at an upward angle relative a top plane of the main body, and a retention tab on the perimeter rim of the main body and extending inward toward a center of the main body. A suction cup is attached to the bottom surface of the main body. The main body may be bowl-like or spoon-like. The retention tab is configured to receive the distal end of a utensil with the handle of the utensil resting on the handle rest. The utensil rest can also be configured as a jar opener, measuring device, and removable handle for a plate or other object.

14 Claims, 8 Drawing Sheets

UTENSIL REST

CROSS REFERENCE TO RELATED APPLICATIONS

This application claims the benefit of U.S. Provisional Application Ser. No. 62/505,260 filed on May 12, 2017.

BACKGROUND OF THE INVENTION

This invention is generally related to useful kitchen items and more particularly to a utensil rest for use separately or in combination with a cooking pot or pan.

Cooking, particularly in the home, is an often hectic, messy, and potentially unhygienic endeavor. Chefs and cooks of all types have longed for an appropriate and secure place to rest their utensils (spoons, spatulas, forks, ladles, etc. . . . ) when they are temporarily set aside during cooking. In most instances, the cook simply places the utensil down on the stove or counter top, which is an obvious safety and hygiene hazard. While there do exist certain spoon rests that can serve the function of providing a resting place and collecting and preventing the spread of food residue from utensils, the existing designs generally comprise nothing more than a curved or profiled plate or oversized spoon placed on the counter top. These devices can be easily displaced and tipped over and are often inconvenient or inaccessible in a hectic cooking environment when the cook is operating several pots and pots with numerous utensils. In many cases, the cook is forced to carry the soiled utensil over the cooking area to reach the device, which commonly results in the unwanted spilling, splatter, or generally spreading of food material. Accordingly, there is a need in the art to improve upon the utility aspects of utensil rests, of which the following invention is directed.

BRIEF DESCRIPTION OF THE DRAWINGS

The drawings appended hereto are mere schematics representations, not intended to portray specific parameters of the invention. Understanding that these drawing(s) depict only typical embodiments of the invention and are not, therefore, to be considered to be limiting its scope, the invention will be described and explained with additional specificity and detail through the use of the accompanying drawing(s), in which.

DETAILED DESCRIPTION

Figure 1:
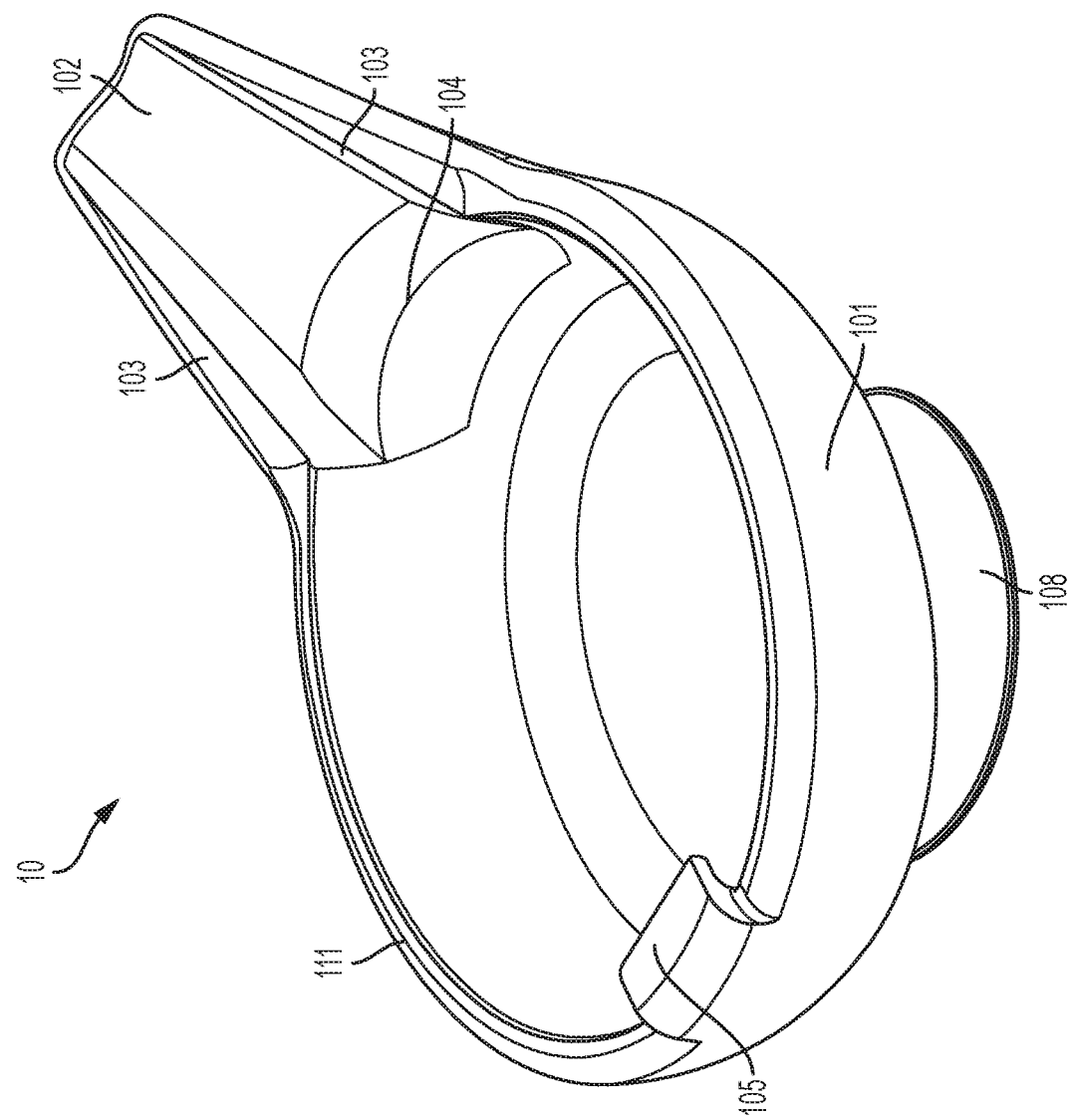
FIG. 1 is a front perspective view of the utensil rest.
Figure 2:
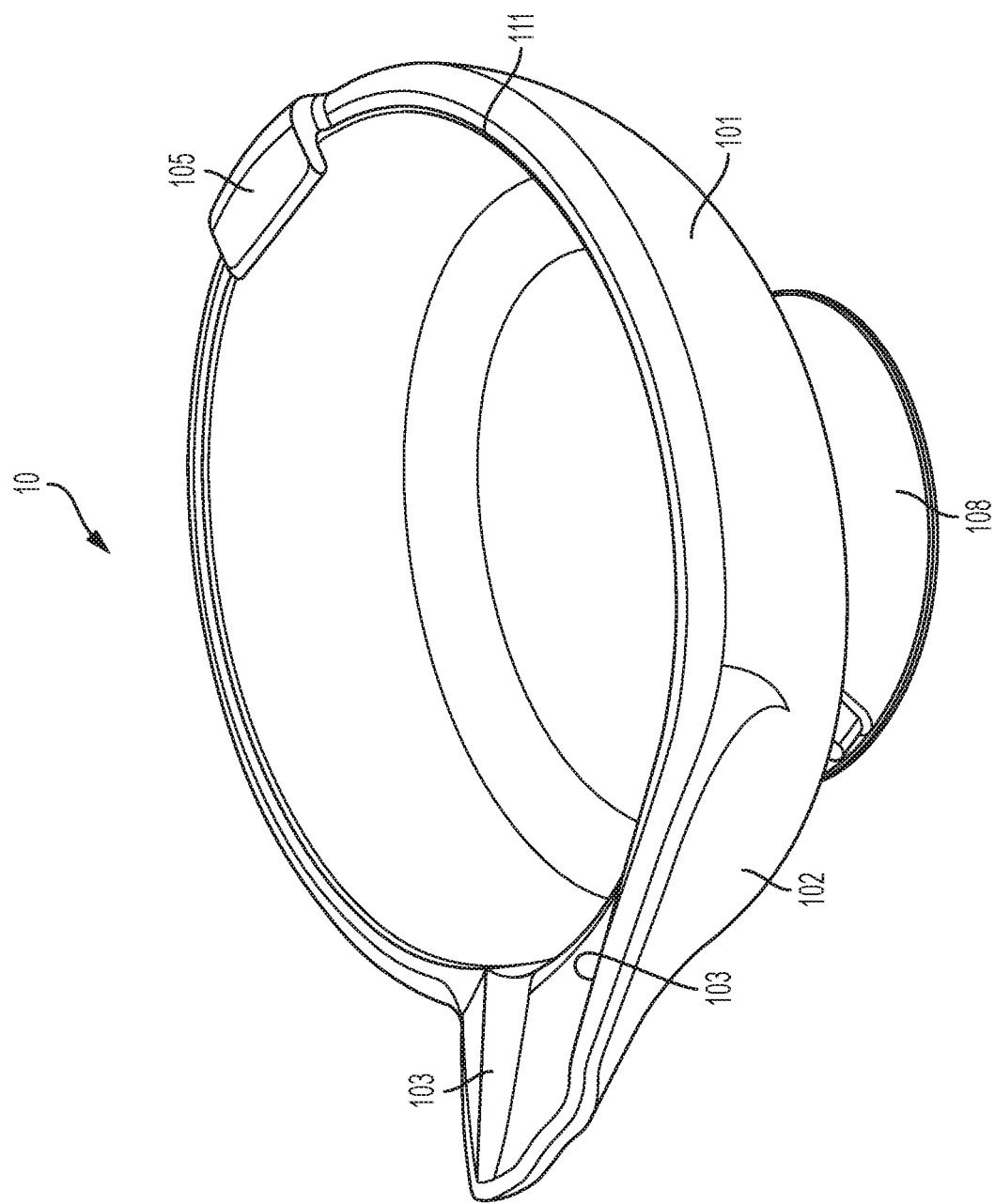
FIG. 2 is a rear perspective view of the utensil rest.

For the purposes of promoting an understanding of the principles of this disclosure, reference will now be made to the exemplary embodiments illustrated in the drawing(s), and specific language will be used to describe the same. It will nevertheless be understood that no limitation of the scope of the invention is thereby intended. Any alterations and further modifications of the inventive features illustrated herein, and any additional applications of the principles of the invention as illustrated herein, which would occur to one skilled in the relevant art and having possession of this disclosure, are to be considered within the scope of the invention.

Reference throughout this specification to an "embodiment," an "example" or similar language means that a particular feature, structure, characteristic, or combinations thereof described in connection with the embodiment is included in at least one embodiment of the present invention. Thus, appearances of the phrases an "embodiment," an "example," and similar language throughout this specification may, but do not necessarily, all refer to the same embodiment, to different embodiments, or to one or more of the figures. Additionally, reference to the wording "embodiment," "example" or the like, for two or more features, elements, etc. does not mean that the features are necessarily related, dissimilar, the same, etc. The features, functions, and the like described herein are considered to be able to be combined in whole or in part one with another as the claims and/or art may direct, either directly or indirectly, implicitly or explicitly.

As used herein, "comprising," "including," "containing," "is," "are," "characterized by," and grammatical equivalents thereof are inclusive or open-ended terms that do not exclude additional un-recited elements or method steps. As used herein the term "distal" generally is understood to mean that which is situated away from the center of the identified structure or from the point of attachment of said structure. The term "proximal" generally is understood to mean that which is situated nearer to the center of the body or to the point of attachment.

With reference to FIG. 1, show is one embodiment of the utensil rest 10 having a main body 101 that may have a generally bowl-like or spoon-like configuration. In some embodiments, the main body 101 has a circular, bowl-like or spoon-like shape or an elongated, bowl-like or spoon-like shape, although other shapes and configurations may be employed without departing from the spirit and scope of the invention. Attached and extending away from the main body 101 is a handle rest 102. In some embodiments, the handle rest 102 extends outward and away from the main body 101 at an upward angle relative the top plane of the main body 101. Further, in some embodiments, the handle rest 102 may taper inward, i.e. narrow, from its proximal to its distal end. The handle rest 102 may optionally have lateral side channels 103 that are configured to retain the handle of a target utensil as will become more apparent in this disclosure. The handle rest 102 may transition to the main body 101 at opening 104 at the base thereof to further enhance the device's ability to receive and retain a utensil.

Figure 3:
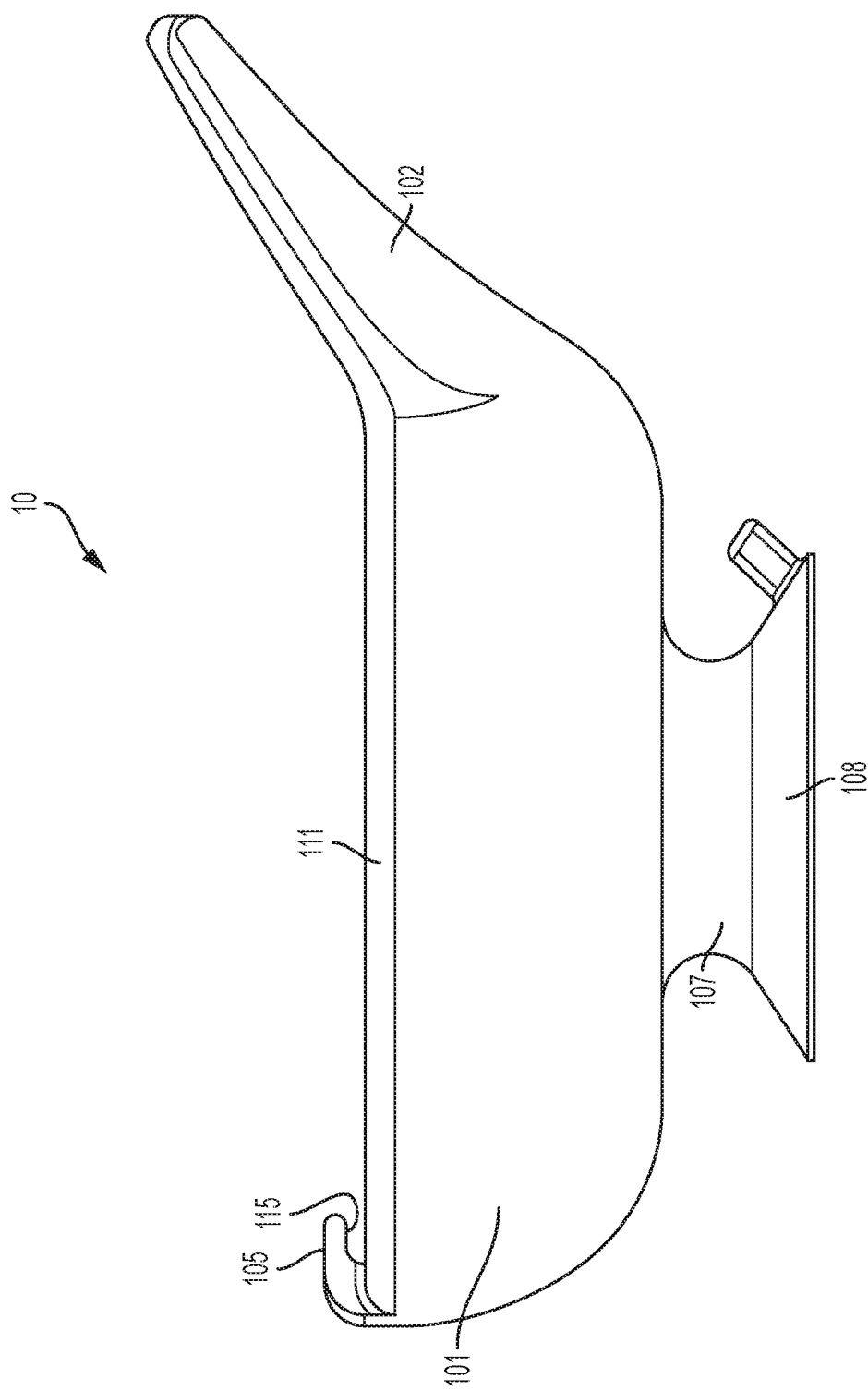
FIG. 3 is a side view of the utensil rest.
Figure 4:
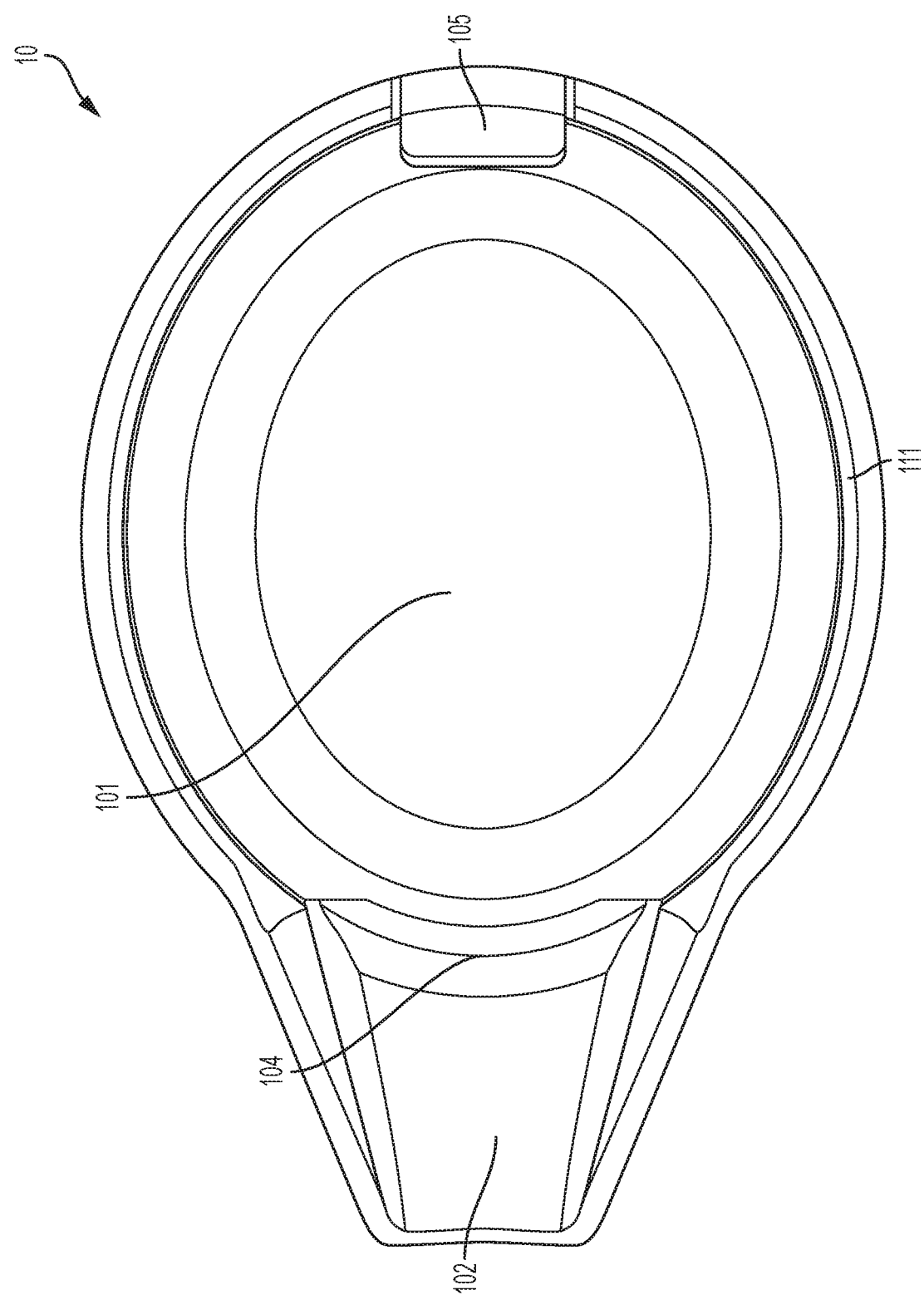
FIG. 4 is a top view of the utensil rest.

The utensil rest 10 further includes a retention tab 105 located along the rim 111 of the main body 101. The retention tab 105 extends inward toward the center of the main body 101. As shown in FIG. 3, the retention tab 105 delimits a gap 115 between the bottom surface of the tab 105 and the rim 111 of the main body 101. This gap 115 is configured to receive at least partially the distal end and/or edge of a utensil as described herein. In some embodiments, the retention tab 105 is located directly across the handle rest 102, such that if the retention tab 105 is considered to be at the "12 o'clock" position, the handle rest 102 is at the "6 o'clock" position. However, other configurations and locations of these two structures are possible without departing from the spirit and scope of the invention disclosed here.

Figure 5:
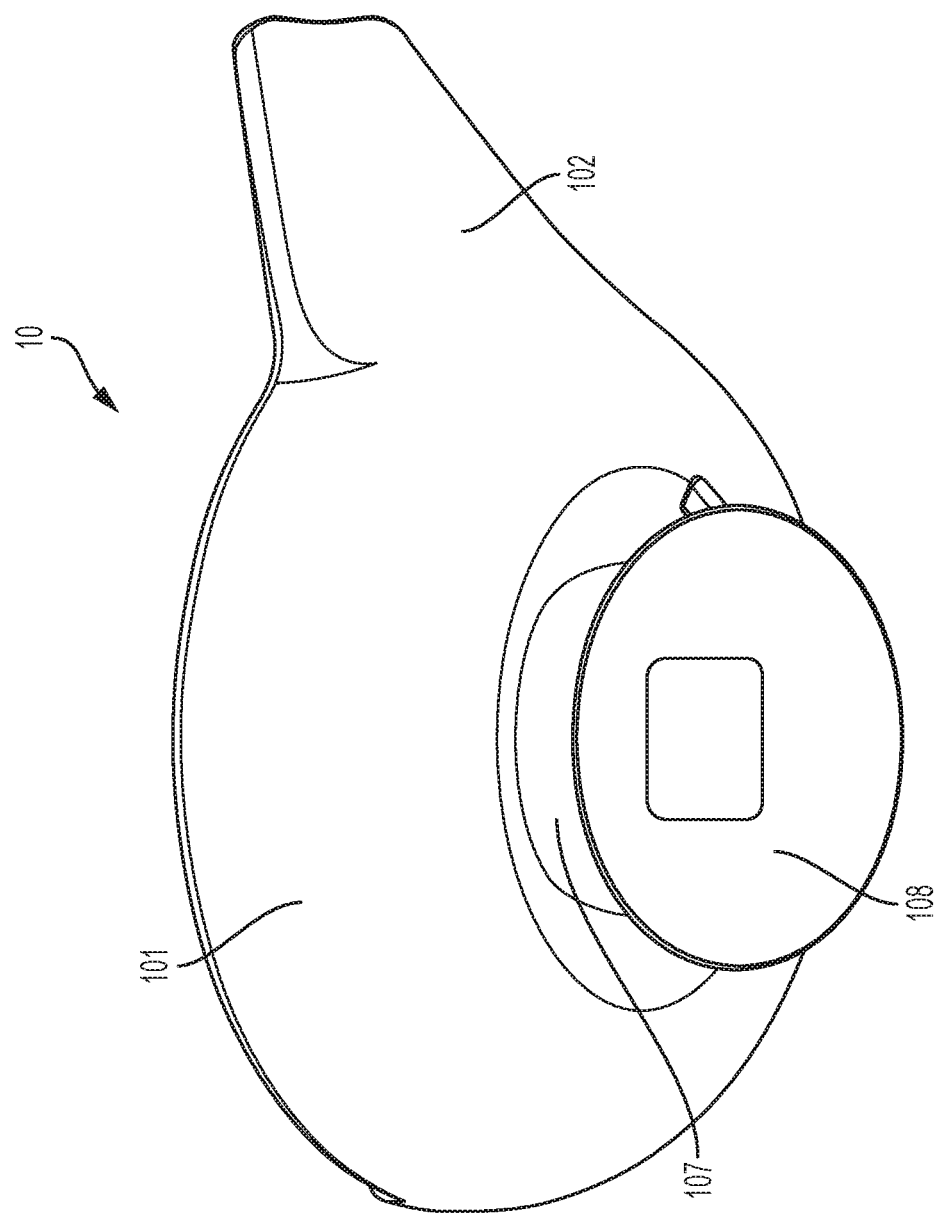
FIG. 5 is a bottom perspective view of the utensil rest.

With reference to FIGS. 3 and 5, extending from the bottom of the main body 101 is a suction cup base 107 that provides an attachment point for a suction cup 108. In some embodiments, the suction cup 108 is removable and replaceable with respect to the cup base 107. The suction cup 108 is used to stabilize the utensil rest 10 on a surface such as a counter top, sink, or lid of a cooking pot or pan. The suction cup provides a secure and skid-proof base that prevents shifting or displacement of the utensil rest 10 while also balancing the utensil rest 10 against the weight of a utensil in order to stabilize the system and prevent tipping. The suction cup 108 can also be used as a removable handle on a plate or other element so as permit the user to utilize such a plate as a lid or cover in the case where, without the utensil rest 10, the plate or other element would not otherwise have a convenient handle or grasping point.

Figure 7:
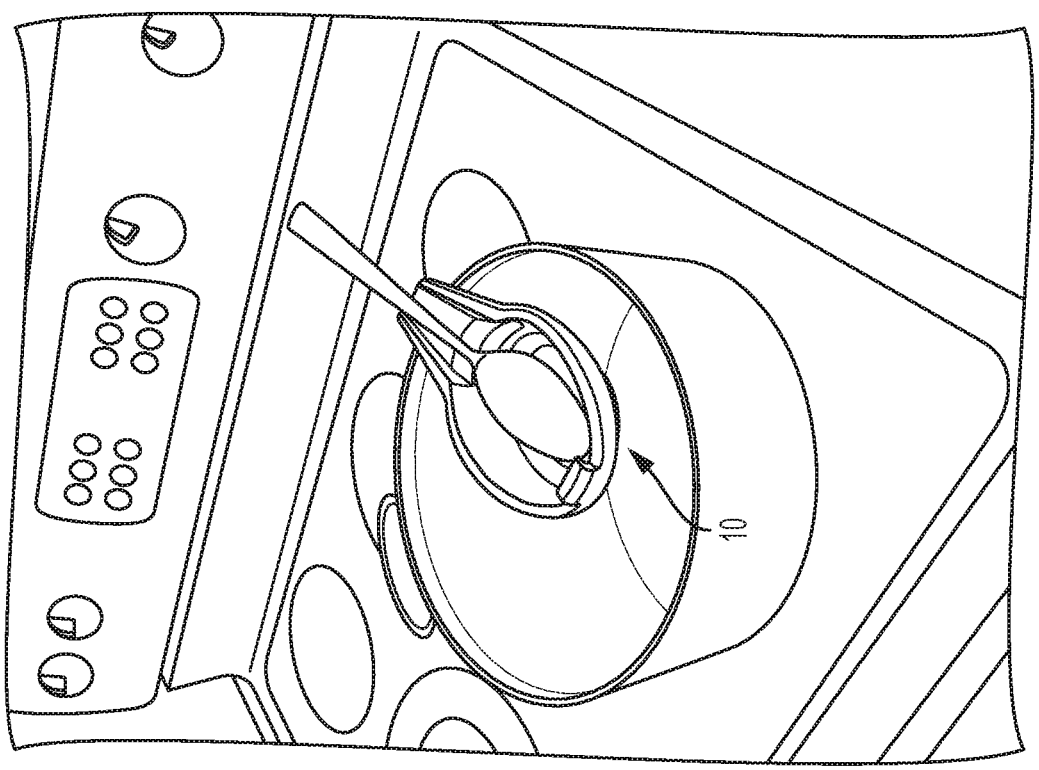
FIG. 7 is a perspective view of the utensil rest in use on a lid of a target cooking pot, with a small spoon.
Figure 6:
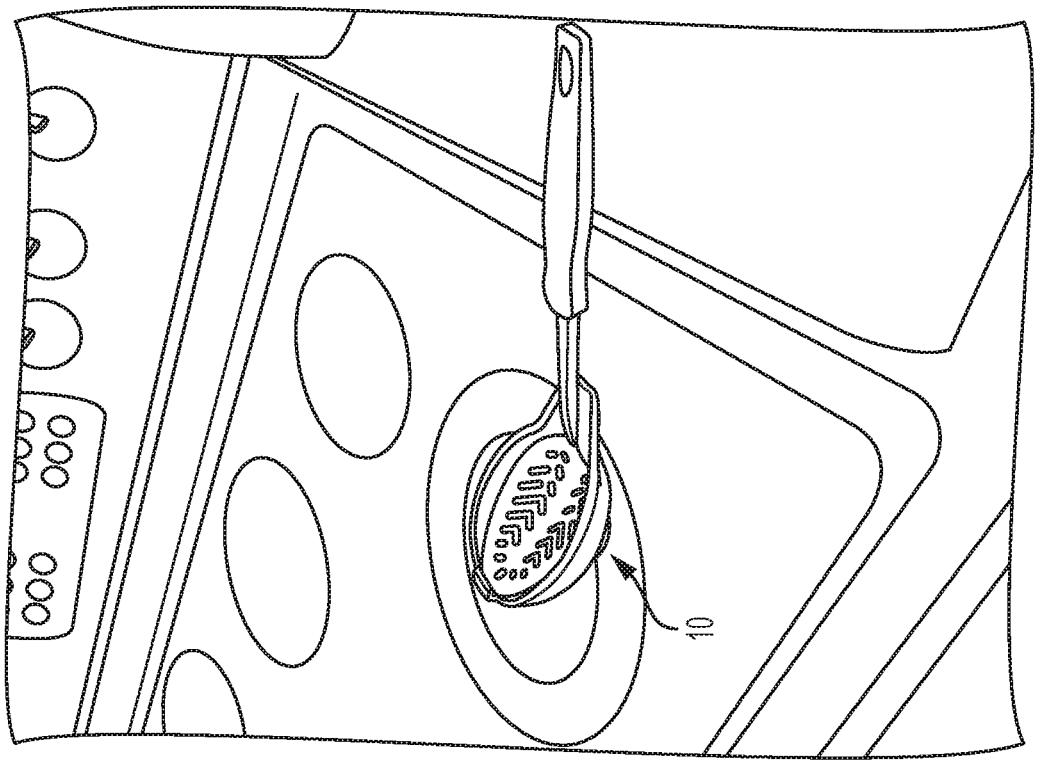
FIG. 6 is a perspective view of the utensil rest in use on a counter top with a larger spoon.
Figure 9:
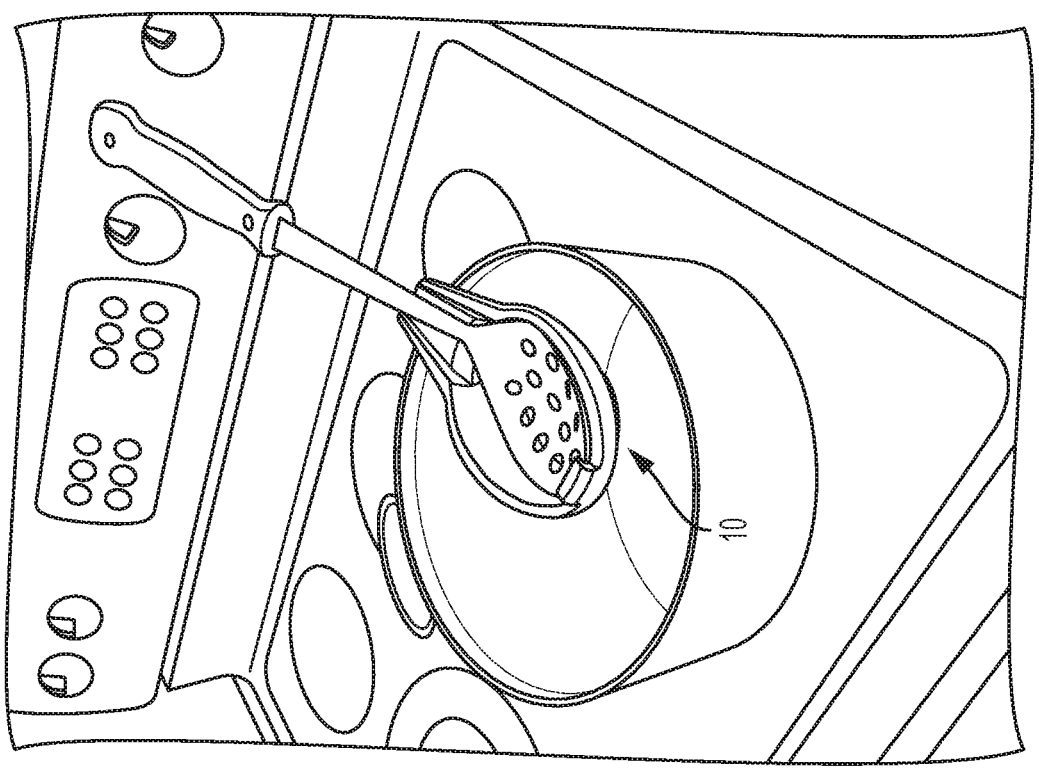
FIG. 9 is a perspective view of the utensil rest in use on a lid of a target cooking pot, with a larger spoon.
Figure 8:
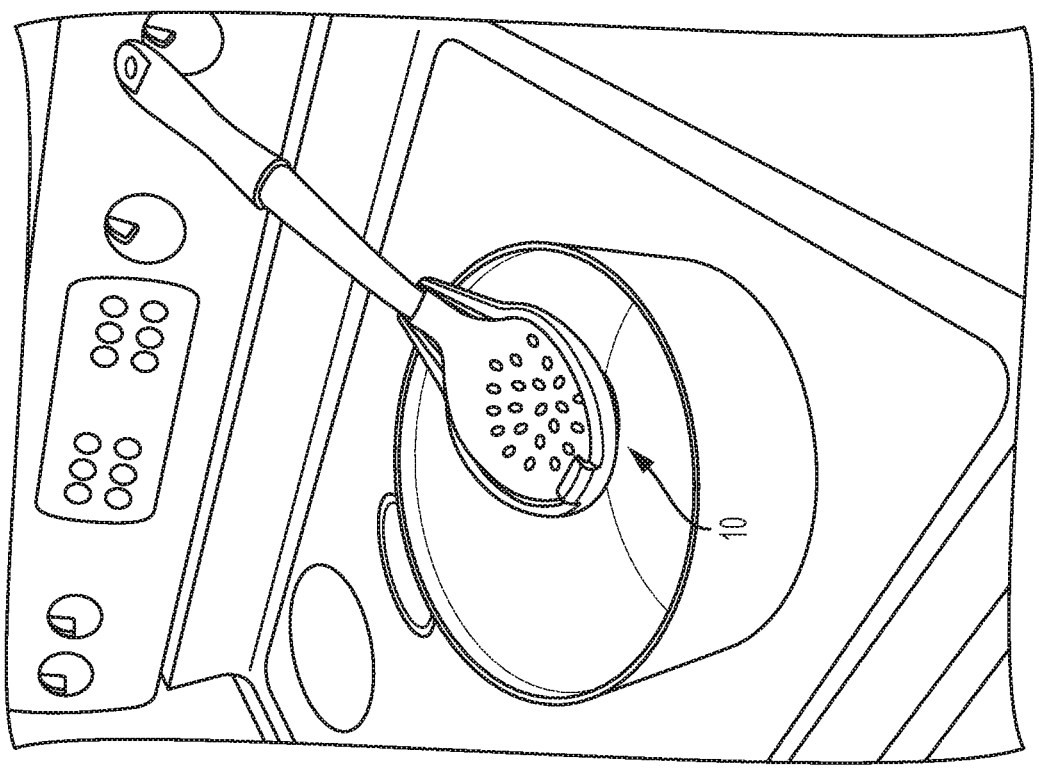
FIG. 8 is a perspective view of the utensil rest in use on a lid of a target cooking pot, with a larger spoon.
Figure 10:
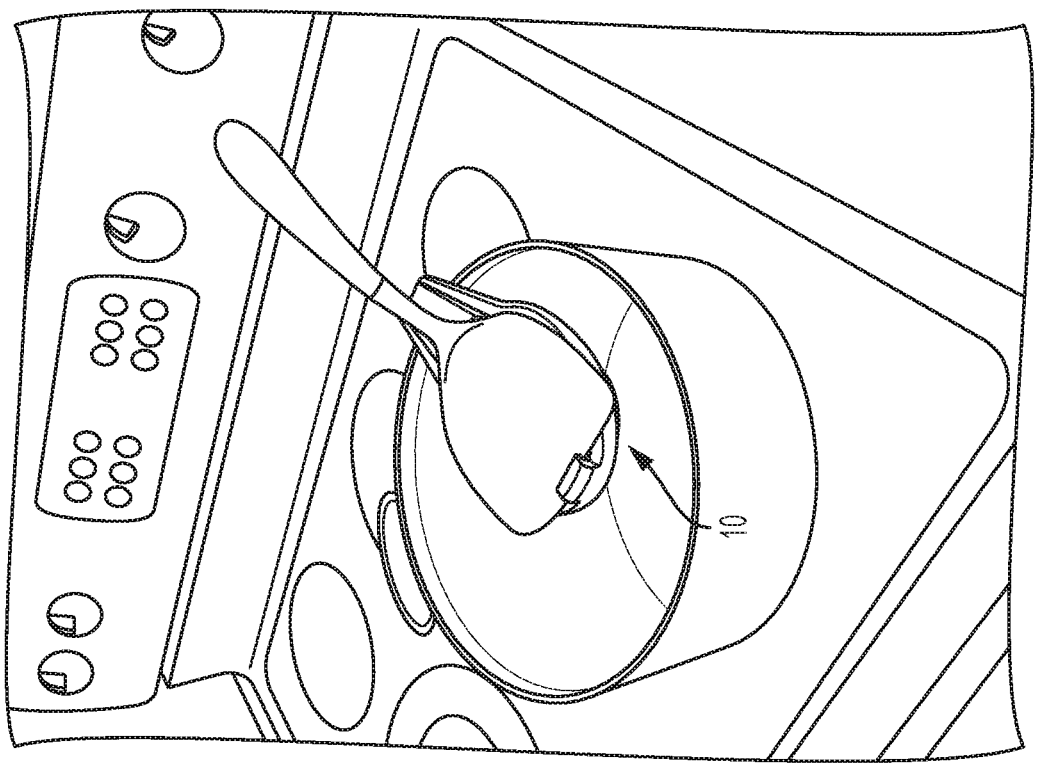
FIG. 10 is a perspective view of the utensil rest in use on a lid of a target cooking pot, with a spatula.

With reference to FIGS. 6-9, shown in the utensil rest 10 used to selectively retain a variety of kitchen utensils. In FIG. 6, the utensil rest 10 is secured via its suction cup 108 to a counter top surface. A large slotted spoon is received in the main body 101 with its distal end held in by the retention tab 105. In some embodiments, the leading distal end of the utensil is received in gap 115 between the bottom surface of the retention tab 105 and the rim 111 of the main body 101. The handle of the slotted spoon rests on the spout 102. The weight of the handle is counterbalanced by the retention tab 105 so that the spoon rests firmly and securely in the utensil rest 10. The suction cup 108 also provides stability to counter the weight and torque caused by the relatively long handle of the large spoon. FIG. 7 demonstrates use of the utensil rest 10 secured to the lid of a pot by the suction cup 108. Here, a small spoon is retained by the rest 10. The retention tab 105 need not be employed due to the relative size and weight of the spoon which is easily and securely retained by the rest 10. In this configuration, the suction cup 108 provides sufficient stability to keep utensil rest solid and upright. FIGS. 8-10 provide other examples of the utensil rest 10 secured to a pot lid surface and in use with a selection of utensils including a spoon and spatula, each with their leading distal ends retained by the retention tab 105 and their handles resting on the spout 102. Again, the combination of the retention tab 105 and the suction cup 108 provides a counter-balancing action on the weight and torque of the utensil in order to securely retain the utensil.

It is appreciated an understood that the utensil rest 10 may comprise a variety of materials such as plastics, rubbers, and combinations thereof. In some embodiments, the utensil rest is sufficiently heat resistant to prevent breakdown, softening, or melting in temperature ranges common to cooking environments, including those extreme temperatures experienced by various cooking pots, pans, and other implements. The suction 108 may have enhanced heat resistant capabilities as it is the primary portion of the utensils rest 10 that comes in contact with hot surfaces. It is further noted that the utensil rest 10 comprises certain ornamental, non-functional aspects including the overall shape, size, and look and feel. Such ornamental features can be varied without affecting the functional features described herein.

The utensil rest 10 may be useful in other contexts and provide additional functionality. For example, as mentioned above, the utensil rest 10 can be attached to a plate or other element to provide a handle or grasping point for an object that otherwise lacks such a handle. The utensil rest 10 can also be used as a jar opener, given that in some embodiments it comprises a resilient material such as rubber that can offer enhanced gripping power for manual opening of jars. In such use, the utensil rest 10 is turned over such that the opening of the main body 101 is received over and around the lid of the jar. Further still, the main body 101 may be designed with a predetermined amount of internal storage space that can function as a measuring device. For example, the main body 101 may be configured to store ½ cup by volume for use as a measuring device. One or more visual indicators such as a line, dash, tick mark, or the like optionally combined with a unit of measure may be molded, etched, screened, or otherwise applied to either the internal or external surface of the main body 101.

While specific embodiments have been described in detail, those with ordinary skill in the art will appreciate that various modifications and alternatives to those details could be developed in light of the overall teachings of the disclosures. Accordingly, the particular arrangements disclosed are meant to be illustrative only and not limiting of the invention, which is to be given the full breadth of the appended claims, and any and all equivalents thereof.

What is claimed is:

1. A utensil rest, comprising:
   a main body having a perimeter rim;
   a handle rest extending outward and away from the main body at an upward angle relative a top plane of the main body;
   a retention tab disposed on the perimeter rim of the main body, the retention tab extending inward toward a center of the main body; and
   a suction cup attached to a bottom surface of the main body.

2. The utensil rest of claim 1, wherein the main body comprises a bowl-like configuration.

3. The utensil rest of claim 1, wherein the retention tab delimits a gap between the retention tab and the rim, the gap receiving a distal end of utensil.

4. The utensil rest of claim 1, wherein the handle rest tapers from the main body to its distal end.

5. The utensil rest of claim 1, wherein the suction cup is removably attached to a suction cup base extending from the bottom surface of the main body.

6. The utensil rest of claim 1, wherein the main body includes at least one visual indicator of measurement.

7. The utensil rest of claim 1, wherein the main body is received over and around a jar to provide supplemental gripping power.

8. A utensil rest, comprising:
   a main body having a bowl-like configuration and a perimeter rim;
   a handle rest extending outward and away from the main body at an upward angle relative a top plane of the main body;
   a retention tab disposed on the perimeter rim of the main body, the retention tab extending inward toward a center of the main body and delimiting a gap between the rim and the retention tab; and
   a suction cup removably attached to a suction cup base extending from a bottom surface of the main body.

9. The utensil rest of claim 8, wherein the main body comprises a bowl-like configuration.

10. The utensil rest of claim 8, wherein the gap receives a distal end of utensil.

11. The utensil rest of claim 8, wherein the handle rest tapers from the main body to its distal end.

12. The utensil rest of claim 8, wherein the suction cup is removably attached to a suction cup base extending from the bottom surface of the main body.

13. The utensil rest of claim 8, wherein the main body includes at least one visual indicator of measurement.

14. The utensil rest of claim 8, wherein the main body is received over and around a jar to provide supplemental gripping power.

\* \* \* \* \*